(12) United States Patent
Ouchi

(10) Patent No.: US 6,268,873 B1
(45) Date of Patent: Jul. 31, 2001

(54) IMAGE GENERATION DEVICE WHICH SELECTS VIEWPOINT CONTROL PROGRAM BASED ON PROGRAM SELECTION DATA SET ON A COURSE, AND INFORMATION STORAGE MEDIUM

(76) Inventor: Satoru Ouchi, 2-8-5, Tamagawa, Ota-ku, Tokyo (JP)

( * ) Notice: Subject to any disclaimer, the term of this patent is extended or adjusted under 35 U.S.C. 154(b) by 0 days.

(21) Appl. No.: 09/131,857

(22) Filed: Aug. 10, 1998

(30) Foreign Application Priority Data

Aug. 14, 1997 (JP) .................................................... 9-233327

(51) Int. Cl.[7] .................................................. G06F 15/00
(52) U.S. Cl. ............................................................ 345/473
(58) Field of Search .................................... 345/419, 473, 345/474, 475, 421, 422

(56) References Cited

U.S. PATENT DOCUMENTS 6,081,271 * 6/2000 Bardon et al. ...................... 345/419

FOREIGN PATENT DOCUMENTS 7-178241  7/1995 (JP) .
A-9-167256  6/1997 (JP) .

* cited by examiner

Primary Examiner—Phu K. Nguyen
(74) Attorney, Agent, or Firm—Oliff & Berridge, PLC

(57) ABSTRACT

An image generation device and an information storage medium that enable sophisticated viewpoint control by simple processing. One viewpoint control program is selected from a plurality of viewpoint control programs, based on program selection data that is set for a course, and the viewpoint is controlled to follow the movement of a moving body, based on the selected viewpoint control program. The viewpoint is controlled by using viewpoint control parameters that are set for the course and are linked to the program selection data. On an ordinary road surface, the line-of-sight direction varies with changes in the inclination of the course, but on an undulating road surface it remains fixed, regardless of changes in the inclination of the course. During an ordinary jump, the line-of-sight direction changes during a fixed time towards the target direction, but during a jump to a high landing point or low landing point, the time during which the line-of-sight direction is changed to the target direction can be varied.

12 Claims, 15 Drawing Sheets

FIG.2

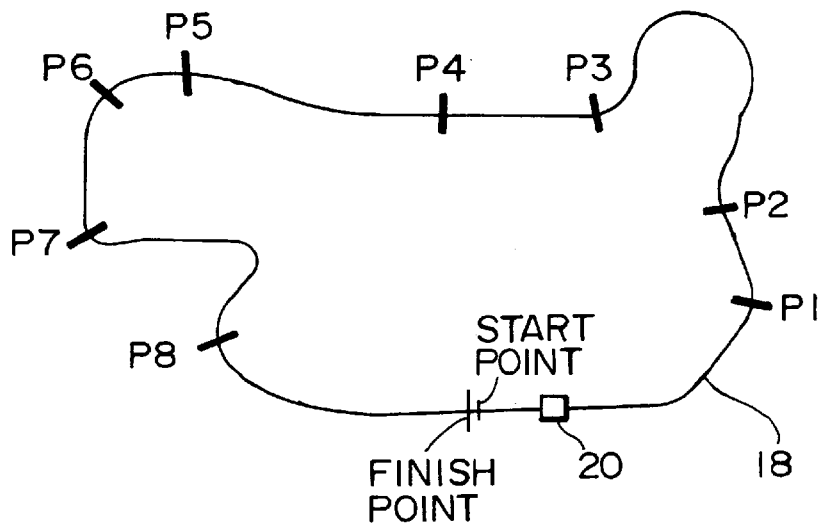

| SWITCHOVER POINT | VIEWPOINT CONTROL PROGRAM | VIEWPOINT CONTROL PARAMETER |
|---|---|---|
| START | ORDINARY VIEWPOINT CONTROL PROGRAM | NONE |
| P1 | VIEWPOINT CONTROL PROGRAM A | NONE |
| P2 | ORDINARY VIEWPOINT CONTROL PROGRAM | NONE |
| P3 | VIEWPOINT CONTROL PROGRAM B | VIEWPOINT CONTROL PARAMETER G1 |
| P4 | ORDINARY VIEWPOINT CONTROL PROGRAM | NONE |
| P5 | VIEWPOINT CONTROL PROGRAM B | VIEWPOINT CONTROL PARAMETER G2 |
| P6 | VIEWPOINT CONTROL PROGRAM C | NONE |
| P7 | VIEWPOINT CONTROL PROGRAM B | VIEWPOINT CONTROL PARAMETER G3 |
| P8 | ORDINARY VIEWPOINT CONTROL PROGRAM | NONE |
|  |  |  |

UPHILL SLOPE

DOWNHILL SLOPE

ORDINARY JUMP

UNDULATING ROAD SURFACE

UNDULATING ROAD SURFACE

JUMP TO HIGH LANDING POINT

IMAGE GENERATION DEVICE WHICH SELECTS VIEWPOINT CONTROL PROGRAM BASED ON PROGRAM SELECTION DATA SET ON A COURSE, AND INFORMATION STORAGE MEDIUM

BACKGROUND OF THE INVENTION

1. Field of the Invention

This invention relates to an image generation device for generating an image as seen from a given viewpoint within an object space, and an information storage medium.

2. Description of Related Art

An image generation device is known in the art for disposing a plurality of display objects within an object space, which is a virtual three-dimensional space, and generating an image as seen from a given viewpoint within that object space, which is highly popular for enabling players to experience a virtual reality. Taking the example of an image generation device for a driving game, a player manipulates a vehicle (moving body) to cause it to travel over a course within an object space, to enjoy a three-dimensional game.

In such a three-dimensional game, the player plays the game while viewing an image at a given viewpoint within the object space. Therefore, if the viewpoint position and line-of-sight direction move in an unnatural manner, or the movement is not as the programmers had intended, the player will experience an unnatural feeling. If an intended game effect cannot be achieved, the player's concentration on the game will be lost. This is why there is currently a great deal of effort and time being invested in the development of programs that control the viewpoint.

SUMMARY OF THE INVENTION

This invention was devised in order to solve the above technical problem, and has as an objective thereof the provision of an image generation device and an information storage medium that enable sophisticated viewpoint control by simple processing.

According to a first aspect of this invention, there is provided an image generation device in order to solve the above described technical problem. This image generation device for generating an image as seen from a given viewpoint within an object space, comprises: means for performing calculations for causing a moving body to move on a course within the object space; means for selecting one viewpoint control program from a plurality of viewpoint control programs, based on program selection data set for the course, and controlling a viewpoint that follows the movement of the moving body, based on the selected viewpoint control program; and means for generating an image as seen from the viewpoint within the object space.

The program selection data that is set for the course is used as the basis for selecting a viewpoint control program, and the viewpoint is controlled on the basis of the selected viewpoint control program. A viewpoint control program that can handle all of the course conditions that can occur is required to have a high-level, complicated structure, so it is not easy to develop. This invention makes it possible to provide a number of viewpoint control programs for handling different areas of the course, enabling the system to cope with various changes in the course conditions. This means that sophisticated viewpoint control can be provided, but with a simple program structure and simple processing. Thus the work required in program development can be reduced, leading to a shortening of the development period.

The viewpoint control means may control the viewpoint on the basis of the selected viewpoint control program and a viewpoint control parameter that is set for the course and linked to the program selection data. This makes it unnecessary to have various programs that differ only in the setting of viewpoint control parameters, making the overall program smaller. In addition, the processing can cope with different changes in course conditions by simply changing a viewpoint control parameter.

The viewpoint control means may select based on the program selection data, a viewpoint control program that causes a line-of-sight direction to vary in accordance with changes in the inclination of the course, when the moving body is moving through an ordinary area of the course; and the viewpoint control means may also select based on the program selection data, a viewpoint control program that holds the line-of-sight direction in a fixed direction irrespective of changes in the inclination of the course, when the moving body is moving in a first area that differs from the ordinary area. This makes it possible to prevent a phenomenon wherein the line-of-sight direction vibrates up and down very slightly in an area of the course when the inclination of the course varies at short intervals.

The viewpoint control means may select based on the program selection data, a viewpoint control program that causes a line-of-sight direction to change to a target direction during a fixed time after the moving body has jumped in an ordinary area of the course; and the viewpoint control means may also select based on the program selection data, a viewpoint control program that causes the line-of-sight direction to change to the target direction after the moving body has jumped in a second area different from the ordinary area, and also provides variable control over the time during which the line-of-sight direction is changed to the target direction. This makes it possible to obtain a more natural image during a jump to a high landing point or a jump to a low landing point, for example.

The viewpoint control means may provide variable control over the time during which the line-of-sight direction is changed to the target direction, based on a viewpoint control parameter that is set for the course and linked to the program selection data. This makes it possible to control the viewpoint as appropriate, to handle course areas with landing points at different heights.

BRIEF DESCRIPTION OF THE DRAWINGS

FIG. 2 is a view illustrating the principle of this embodiment.

DESCRIPTION OF PREFERRED EMBODIMENTS

A preferred embodiment of this invention is described below, with reference to the accompanying drawings. Note that the description below concerns an example where this invention is applied to a bike-riding game, but the game to which the present invention can be applied is not limited thereto.

Figure 1:
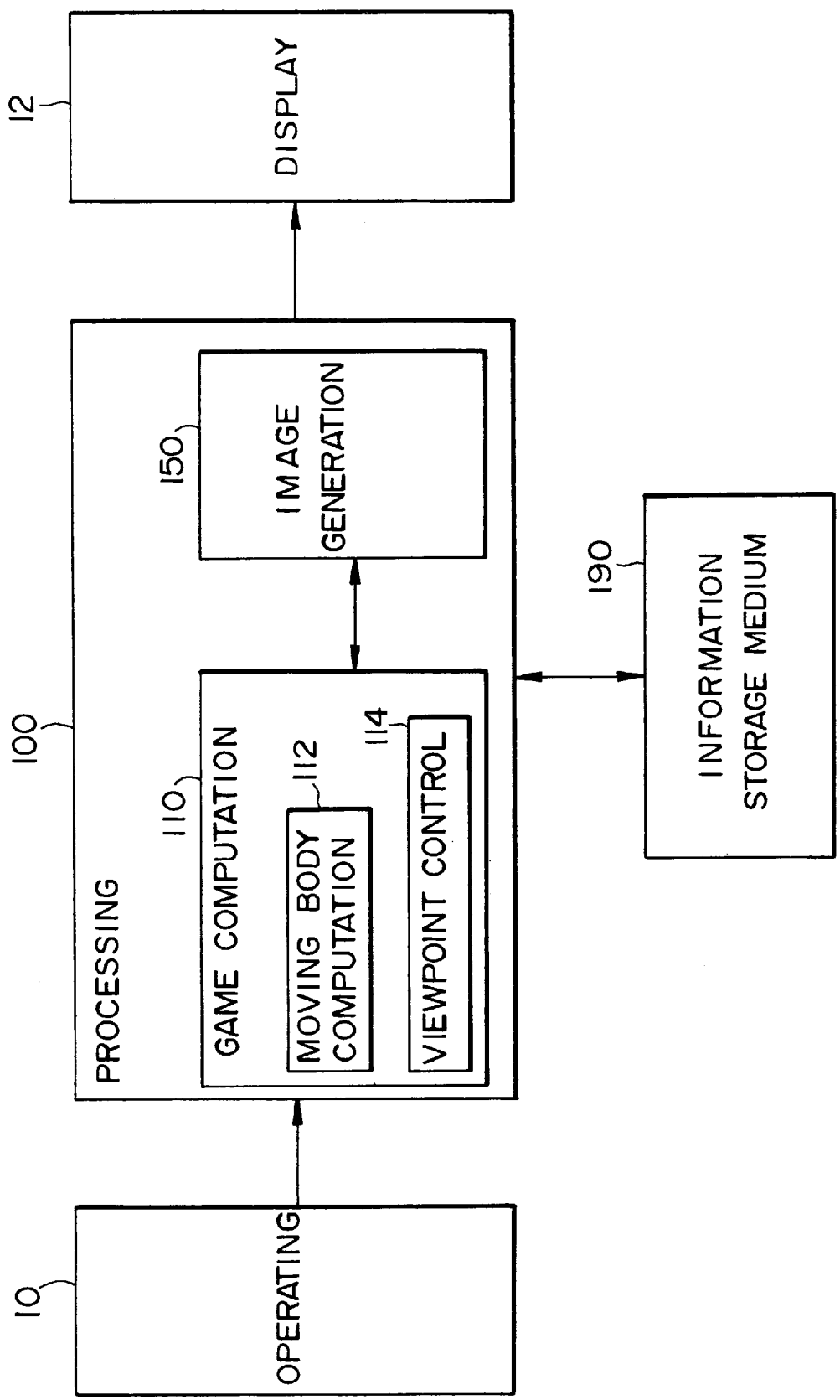
FIG. 1 shows an example of a function block diagram of the image generation device in accordance with an embodiment of this invention.

A function block diagram of an image generation device in accordance with this invention is shown in FIG. 1, by way of example.

Figure 14:
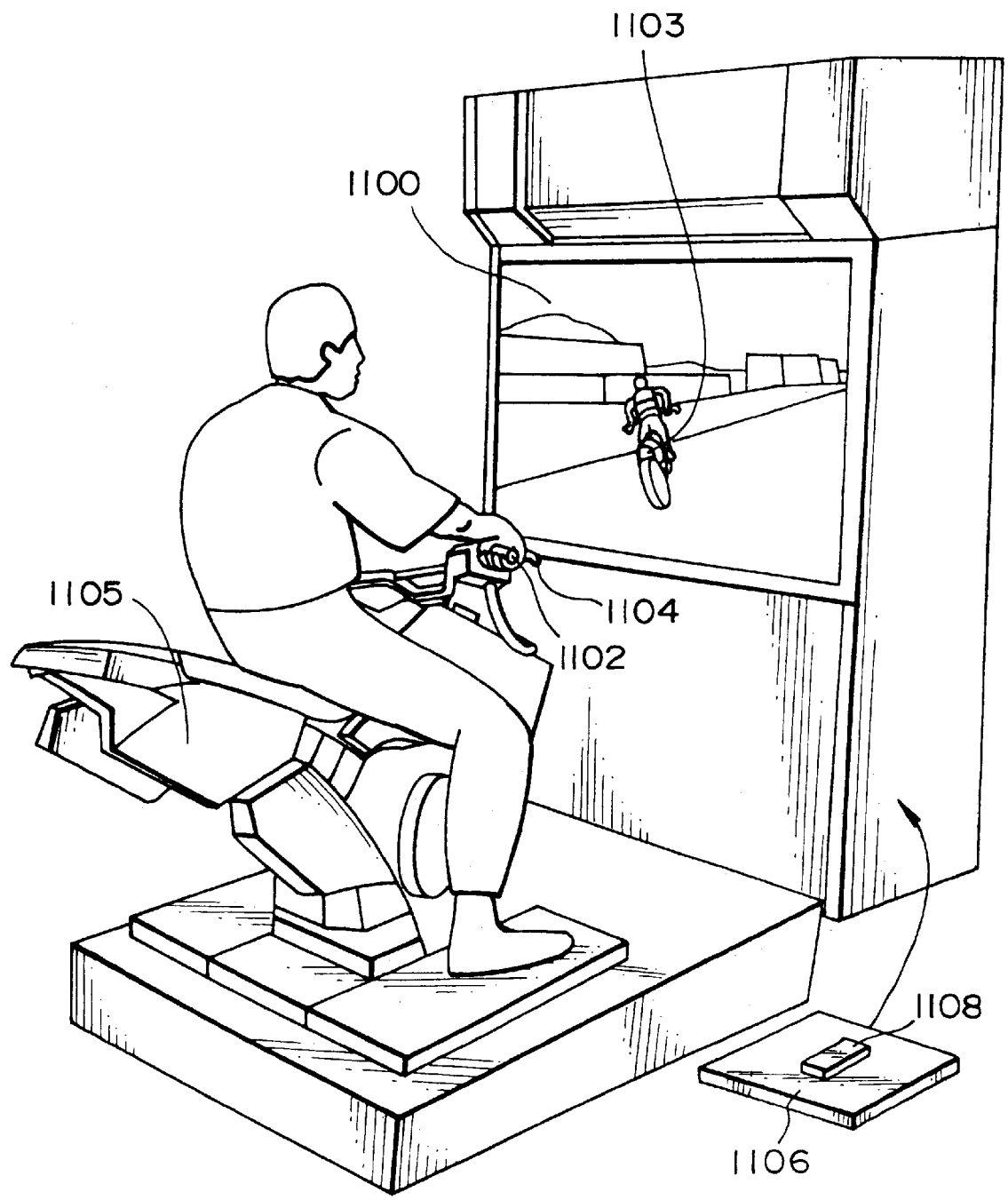
FIG. 14 shows an example of an arcade game machine to which this embodiment is applied.

In this case, an operating section 10 allows a player to input manipulation data by operating an accelerator and brakes and rolling (banking) a vehicle shaped like a motorbike (see FIG. 14). The manipulation data obtained by the operating section 10 is input to a processing section 100.

The processing section 100 performs processing for disposing display objects within an object space and processing for generating an image of the resultant object space from a given viewpoint, based on this manipulation data and a given program. The functions of this processing section 100 could be implemented by hardware such as a CPU (either complex instruction set computer (CISC) or reduced instruction set computer(RISC)), a digital signal processor (DSP), an application specific IC (ASIC) (such as a gate array), or memory.

An information storage medium 190 holds programs and data. The functions of this information storage medium 190 could be implemented by hardware such as a CD-ROM, game cassette, IC card, magneto-optical (MO) disk, floppy disk, digital video disk (DVD), hard disk, or ROM. The processing section 100 performs the various processing thereof on the basis of programs and data from this information storage medium 190.

The processing section 100 comprises a game computation section 110 and an image generation section 150. In this case, the game computation section 110 performs the various processing required during the game, such as setting the game mode, moving the game forward, determining the position and direction of the moving body, determining the viewpoint position and line-of-sight direction, and disposing the display objects within the object space. The image generation section 150 creates an image at a given viewpoint, with the object space as set by the game computation section 110. The image produced by the image generation section 150 is shown on a display section 12.

A moving body computation section 112 performs calculations for causing moving bodies (bikes) operated by the player, other players, and the computer to move over a course within the object space, based on the manipulation data that is input from the operating section 10 and a given program. More specifically, the position and direction of each moving body are calculated every frame, for example.

Assume that the position of a moving body in a (k−1)th frame is $PMk_{k-1}$, the velocity thereof is $VMk_{k-1}$, the acceleration thereof is $AM_{k-1}$, and the time taken by each frame is $\Delta t$, by way of example. Thus the position $PM_k$ and velocity $VM_k$ of the moving body in the kth frame can be obtained from Equations 1 and 2 below.

$$PM_k = PM_{k-1} + VM_{k-1} \times \Delta t \qquad (1)$$

$$VM_k = VM_{k-1} + AM_{k-1} \times \Delta t \qquad (2)$$

A viewpoint control section 114 performs calculations to obtain a viewpoint position and line-of-sight direction, based on the course data or data on the position and direction of the moving body that is obtained by the moving body computation section 112. More specifically, the viewpoint is controlled in such a manner as to follow the moving body operated by the player with inertia, for example. The image generation section 150 generates an image as seen from a viewpoint controlled by this viewpoint control section 114.

A first characteristic of this embodiment is that the selection of one viewpoint control program from a plurality of viewpoint control programs is based on program selection data that is set for a course, and control over the viewpoint is based on the thus selected viewpoint control program.

More specifically, the processing is as described below.

That is to say, switchover points P1 to P8 of a viewpoint control program are set on a course 18, as shown in FIG. 2. Program selection data 30 of a data structure also shown in FIG. 2 is set to correspond to each of these switchover points P1 to P8.

When a moving body 20 that is running along the course 18 is located in an area between a start point and the switchover point P1, for example, an ordinary viewpoint control program is selected on the basis of the program selection data 30 and the viewpoint control section 114 of FIG. 1 controls the viewpoint in accordance with the thus-selected program.

As the moving body 20 continues to run and passes the switchover point P1, a viewpoint control program A is now selected and the viewpoint control section 114 controls the viewpoint in accordance with the thus-selected program.

Note that the determination of whether or not the moving body 20 has passed a switchover point could be based on a factor such as the distance it has traveled from the start point. In other words, the distance of each switchover point from the start point is stored in a given area in memory and the determination can be made by comparing the distance of the moving body 20 from the start point and the distances of each of the switchover points from the start point.

When the moving body 20 passes the switchover point P2, the ordinary viewpoint control program could now be selected, for example, so that the viewpoint control section 114 controls the viewpoint in accordance with that program. In a similar manner, a viewpoint control program B, the ordinary viewpoint control program, the viewpoint control program B, a viewpoint control program C, the viewpoint control program B, and the ordinary viewpoint control program are selected when the moving body 20 passes switchover points P3, P4, P5, P6, P7, and P8, respectively, and the viewpoint control section 114 controls the viewpoint in accordance with the thus selected program.

In the embodiment configured in this manner, sophisticated viewpoint control can be performed with a simple programming structure and simple processing, because the viewpoint control program is switched on the basis of program selection data that is set for the course 18. In other words, since sophisticated viewpoint control can be provided without having to develop complicated, high-level programs, the work required in program development can be reduced, leading to a shortening of the development period.

A second characteristic of this embodiment is that control of the viewpoint is based on the viewpoint control program selected in accordance with the program selection data 30 and the viewpoint control parameters 32 that are set for the course 18 and linked to the program selection data 30. For example, when the moving body 20 passes the switchover point P3 in FIG. 2, the viewpoint control program B and a viewpoint control parameter G1 are read out. The viewpoint control section 114 controls the viewpoint by setting the viewpoint control parameter G1 in this viewpoint control program B. Similarly, when switchover points P5 and P7 have been passed, the viewpoint control section 114 controls the viewpoint by setting viewpoint control parameters G2 and G3, respectively, into the viewpoint control program B.

If viewpoint control parameters are not used, it will become necessary to provide separate programs as viewpoint control programs to be used when each of the switchover points P3, P5, and P7 is passed. With this embodiment of the invention, the use of viewpoint control parameters makes it unnecessary to provide separate programs. This makes it possible to design a program that is more compact, thus saving on the amount of memory required for storing that programs. In addition, different viewpoint control can be performed in each area of the course 18 by using different viewpoint control parameters, so various kinds of viewpoint control can be provided.

Examples of viewpoint control in accordance with various different viewpoint control program will now be described. Note that, although the description below relates to examples of third-person viewpoints, the present invention is not limited thereto and it can equally well be applied to first-person viewpoints.

1. Ordinary Running

Figure 3A:
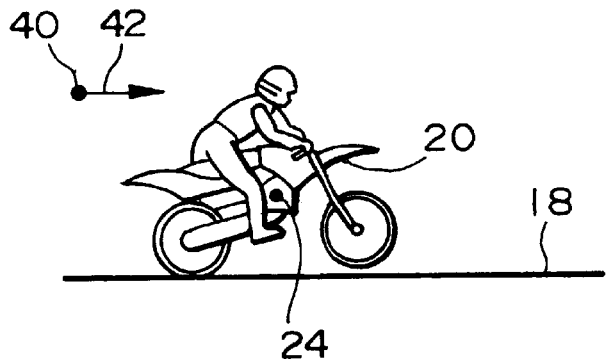
FIGS. 3A, 3B, and 3C are views illustrating ordinary viewpoint control.

In this embodiment, a viewpoint 40 is set to be a fixed distance away from a representative point 24 of the moving body 20, as shown in FIG. 3A. The viewpoint 40 follows the movement of the moving body 20 (or rather, the representative point 24 thereof) with inertia.

Figure 3B:
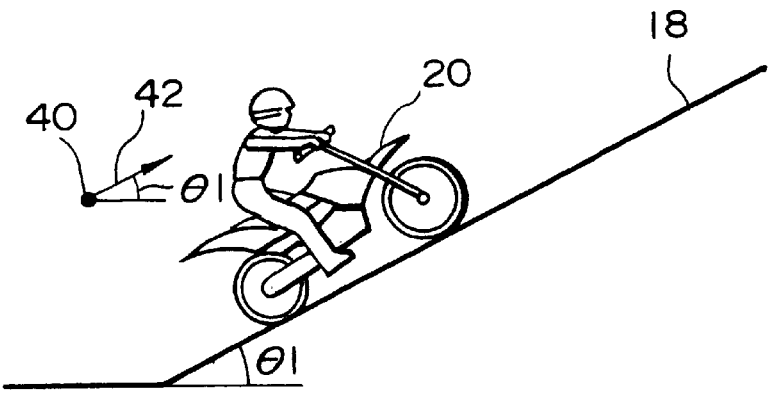
Figure 3C:
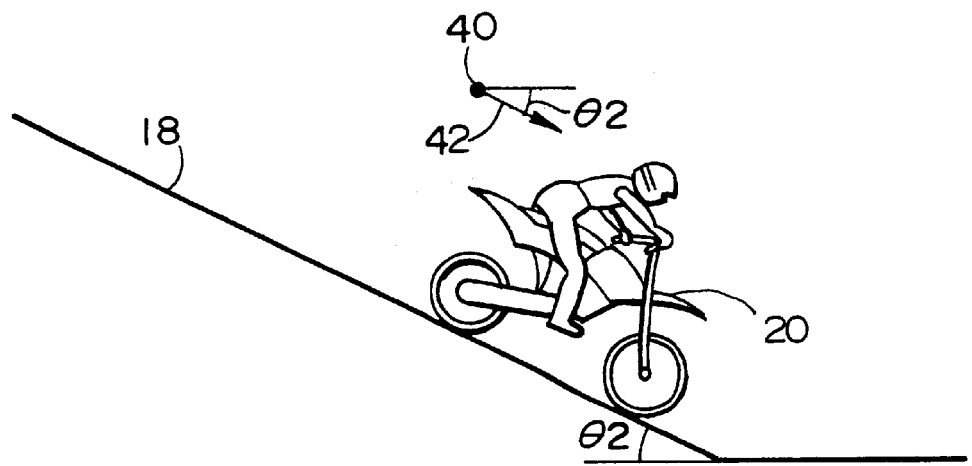

A line-of-sight direction 42 points in the direction of the moving body 20. This line-of-sight direction 42 is controlled in such a manner that it varies with the inclination of the course 18. In other words, when the course is horizontal as shown in FIG. 3A, the line-of-sight direction 42 is also horizontal. If an angle of inclination θ1 of the course 18 is that of an uphill slope as shown in FIG. 3B, the line-of-sight direction 42 is aligned in the direction of this angle of elevation θ1. Similarly, if an angle of inclination θ2 of the course 18 is that of a downhill slope as shown in FIG. 3C, the line-of-sight direction 42 is aligned in the direction of this angle of dip θ2.

Figure 4:
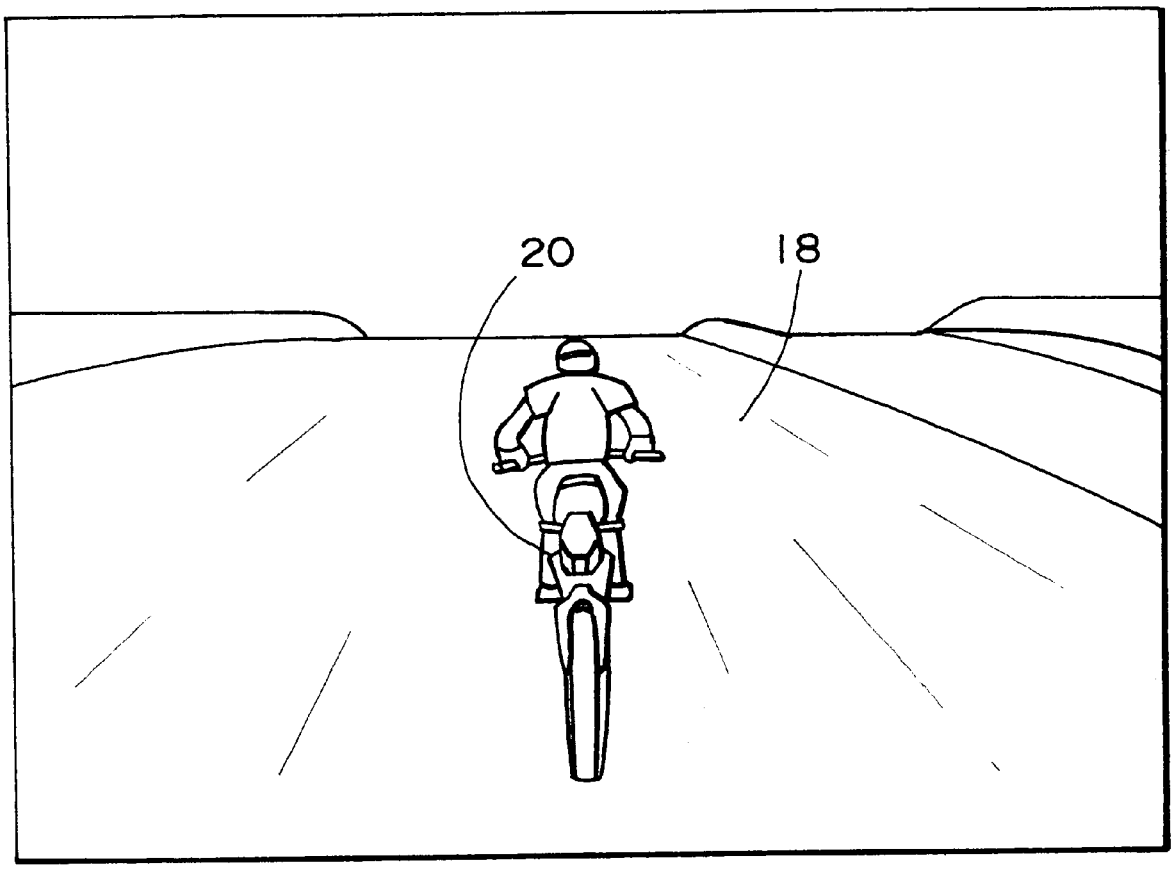
FIG. 4 shows an example of an image generated by this embodiment when the moving body is running on an uphill slope.
Figure 5:
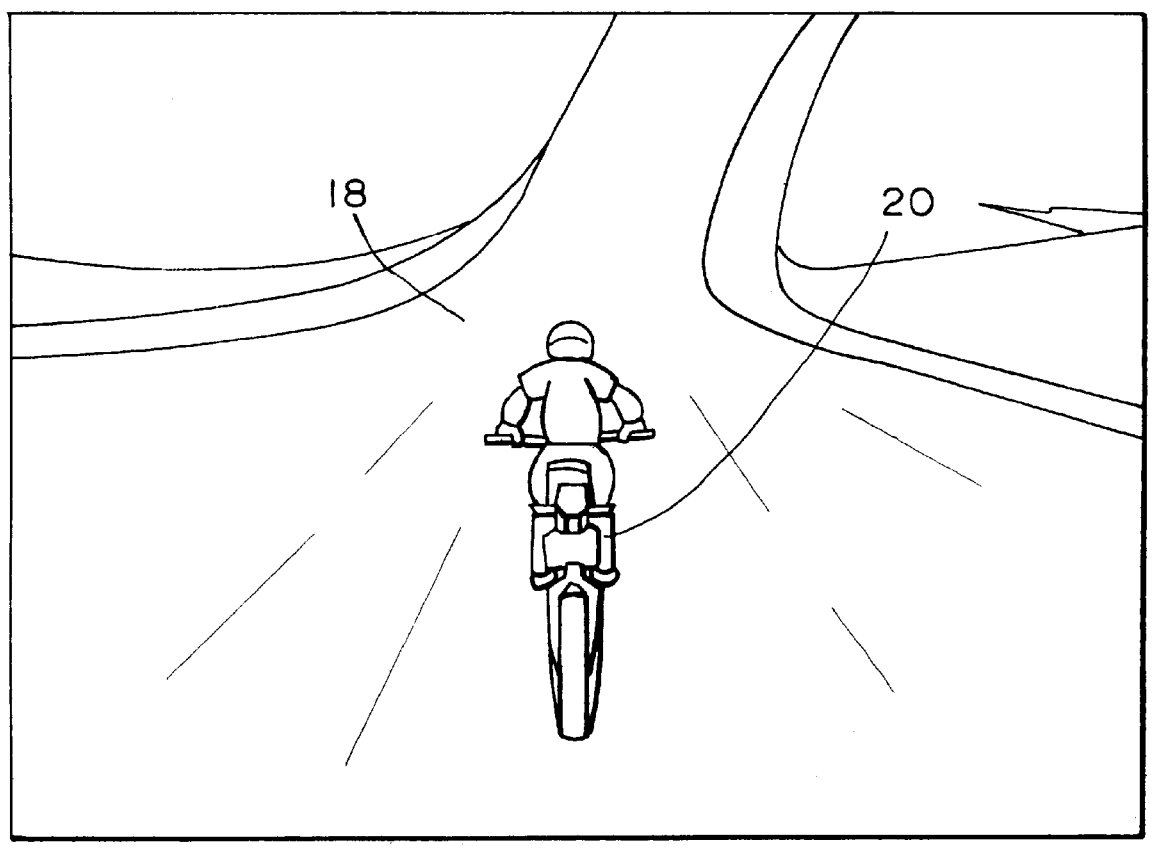
FIG. 5 shows an example of an image generated by this embodiment when the moving body is running on a downhill slope.

Examples of images shown on the display section 12 when the moving body 20 is running along an uphill slope and a downhill slope are shown in FIGS. 4 and 5, respectively. These images are each as seen from the viewpoint 40, in the line-of-sight direction 42. As shown in FIGS. 4 and 5, it is possible to see the entire course 18 by making the line-of-sight direction 42 vary in accordance with the inclination of the course 18, even with an uphill slope or a downhill slope.

Note that control of the line-of-sight direction 42 is done by cancelling out small changes in the line-of-sight direction 42 and also smoothing large changes therein.

Figure 6:
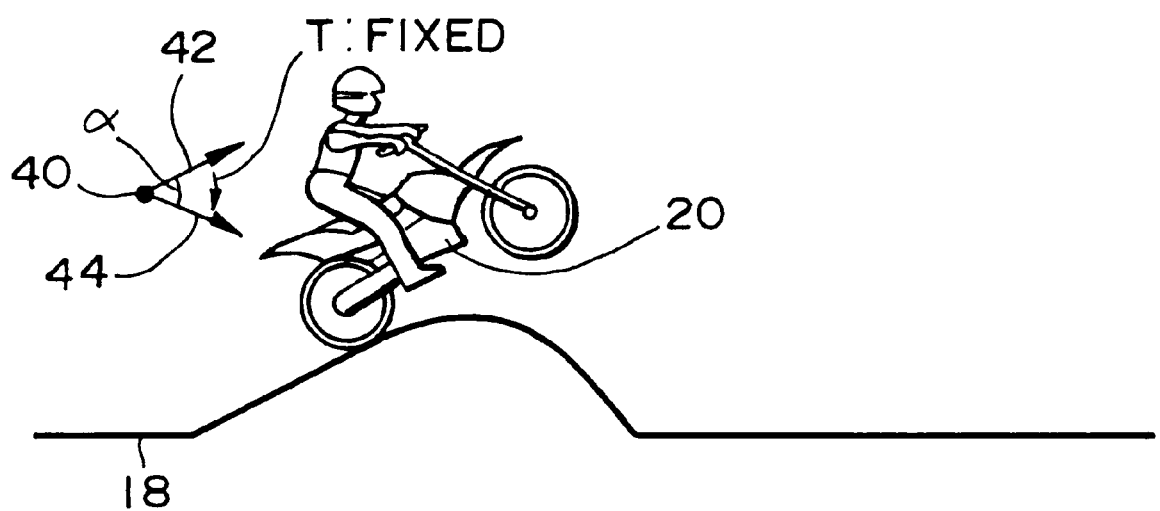
FIG. 6 is a view illustrating viewpoint control during an ordinary jump.

When the moving body 20 has jumped, the line-of-sight direction 42 is controlled in the manner described below. After the moving body 20 jumps, the line-of-sight direction 42 is controlled in such a manner that it changes to a target direction 44, as shown in FIG. 6, during a fixed time T (during T frames). More specifically, if the angle between the line-of-sight direction 42 and the target direction 44 is assumed to be α, the control is such that the angle of the line-of-sight direction 42 changes by α/T in each subsequent frame. In this manner, the line-of-sight direction 42 can be made to change in such a manner that it is aligned at the sky immediately after the jump but drops to the landing point on the course 18 immediately before the moving body lands.

Figure 7:
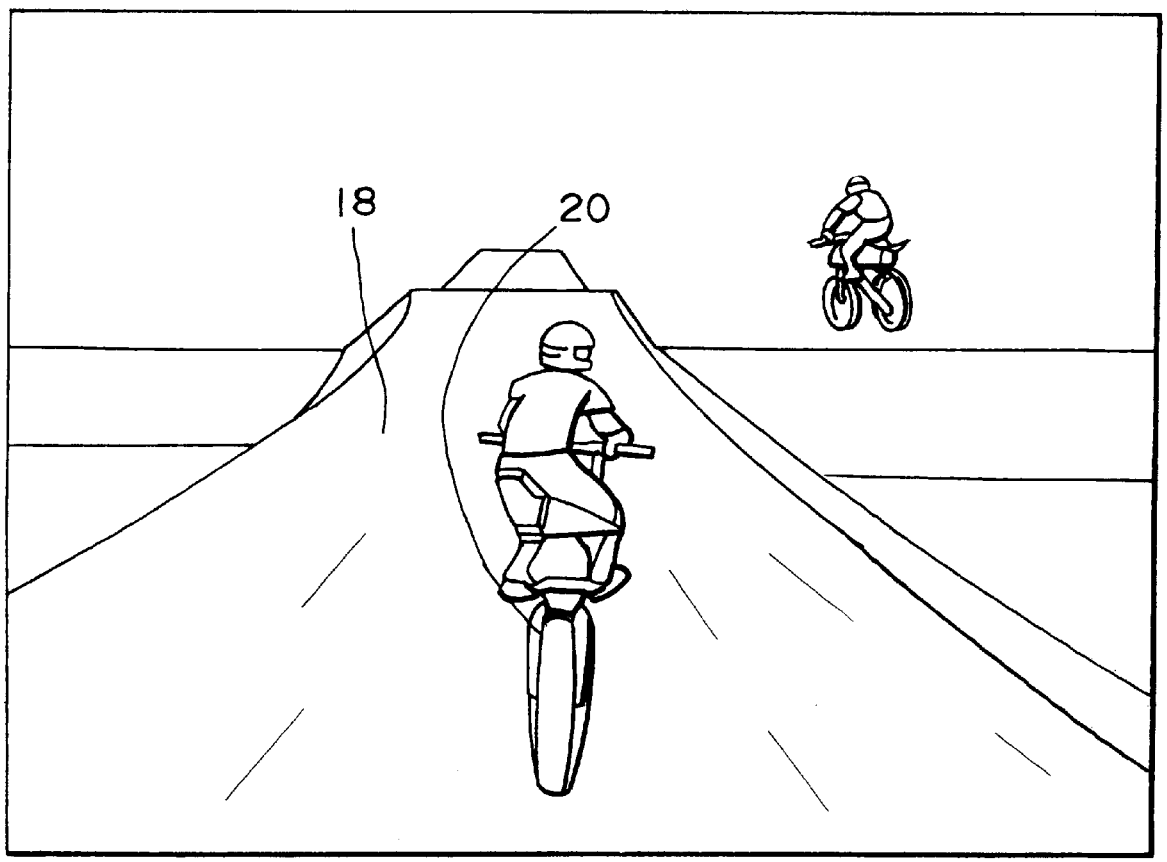
FIG. 7 shows an example of an image generated by this embodiment during an ordinary jump.

Note that an example of the image shown on the display section 12 while the moving body 20 is jumping is shown in FIG. 7.

2. Undulating Road Surface When the bike is running normally in this embodiment (running under an ordinary viewpoint control program), the line-of-sight direction 42 is made to vary with the inclination of the course 18, as shown in FIGS. 3A, 3B, and 3C.

Figure 8:
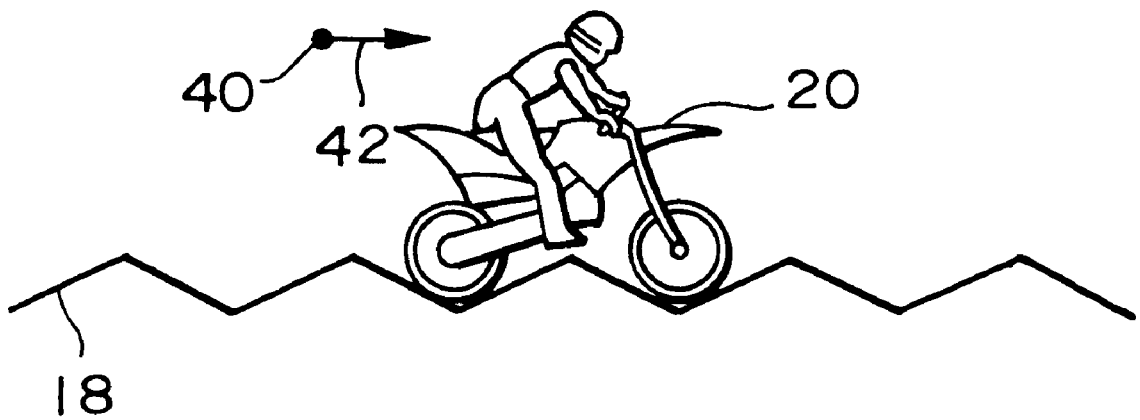
FIG. 8 is a view illustrating viewpoint control when the moving body is running over an undulating road surface.

However, if the line-of-sight direction 42 were to change in accordance with the inclination of the course 18 when the moving body 20 is running along a part of the course 18 that has an undulating road surface, as shown in FIG. 8, the line-of-sight direction 42 would vibrate up and down very slightly. This would induce an unpleasant feeling in the player, so that the player's concentration on the game will be reduced.

One method that could be considered for handling this problem is to write a program that evaluates the road surface state and, if this evaluation program determines that the road surface varies as shown in FIG. 8, to ensure that the line-of-sight direction 42 does not vary. However, use of this method has disadvantages in that it is necessary to have a complicated evaluation program and also the processing load of that evaluation program is large.

With this embodiment of the invention, this is handled by switching from the ordinary viewpoint control program to another viewpoint control program (hereinafter called a "first viewpoint control program") which holds the line-of-sight direction in a fixed direction, independent of changes in inclination of the course. In other words, the program selection data 30 of FIG. 2 is set to switch the viewpoint control program if the moving body 20 enters an area having an undulating road surface. If the area between switchover points P1 and P2 has an undulating road surface, by way of example, this first viewpoint control program is set for the viewpoint control program A of FIG. 2. This first viewpoint control program operates to control the line-of-sight direction to stay in a fixed direction independently of changes in inclination of the course 18, as shown in FIG. 8.

Switching the viewpoint control programs in this manner enables viewpoint control that helps the player enjoy the game, without using a complicated program such as one to evaluate the road surface.

Figure 9:
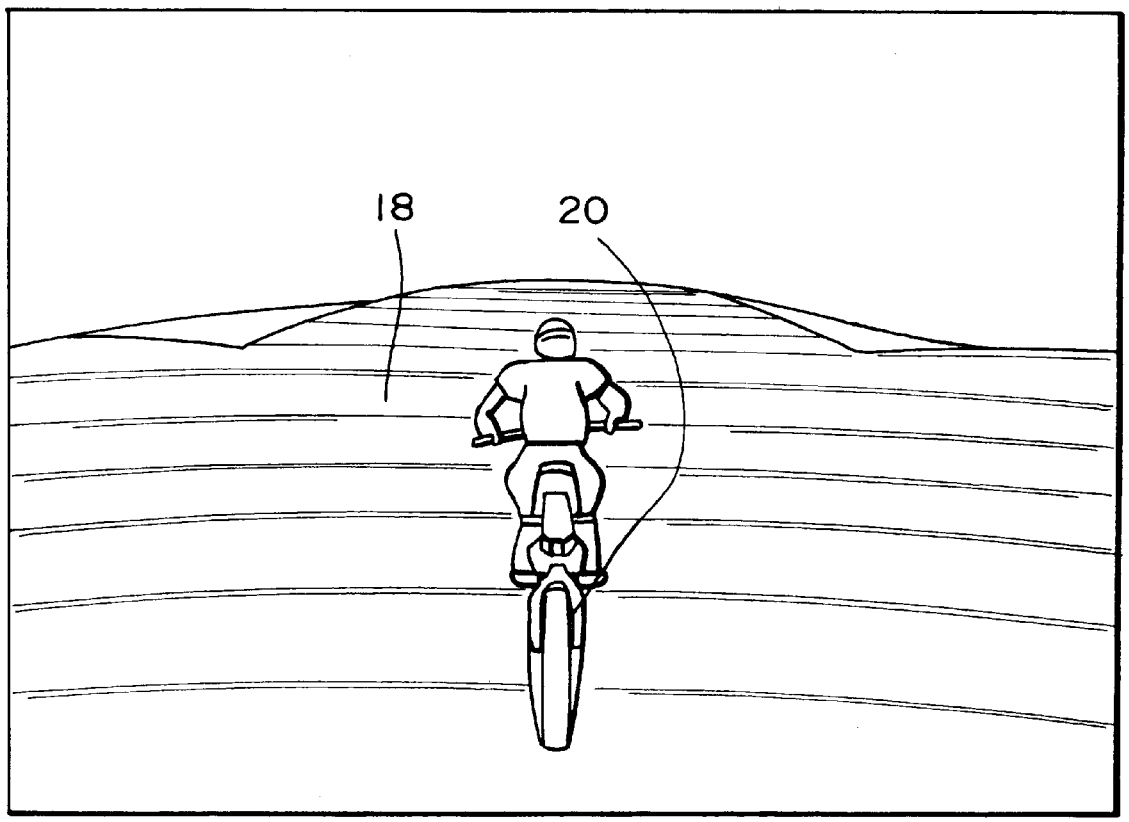
FIG. 9 shows an example of an image generated by this embodiment when the moving body is running over an undulating road surface.
Figure 10A:
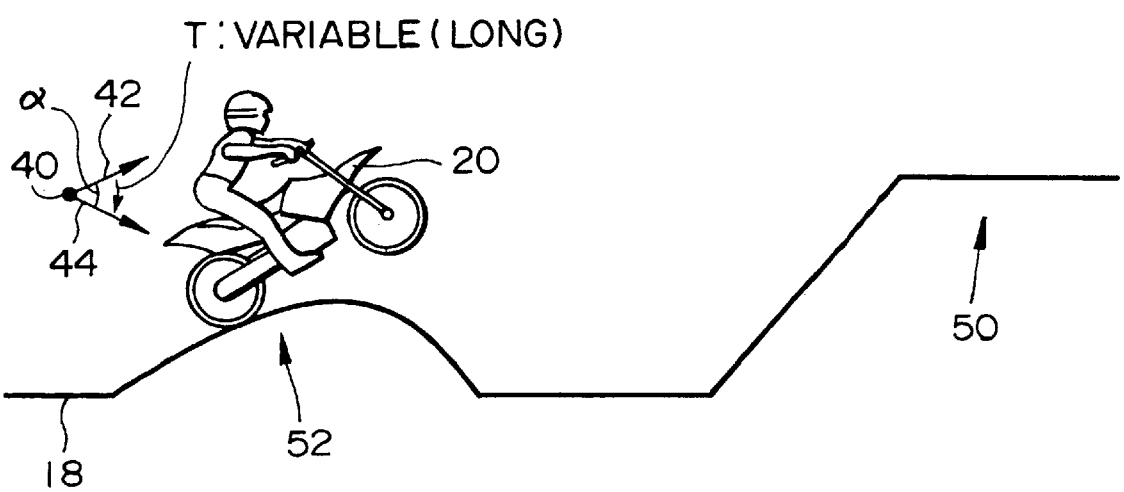
FIGS. 10A and 10B are views illustrating viewpoint control when the moving body is jumping to a high landing point and to a low landing point, respectively.

Note that an example of the image shown on the display section 12 while the moving body is running over an undulating road surface is shown in FIG. 9. With this embodiment of the invention, the line-of-sight direction does not vibrate slightly up and down, even when the bike is on such an undulating road surface, which efficiently prevents the inducing of an unpleasant feeling in the player 3. Special Jumps The state of the course 18 could be such that a landing point 50 of the moving body 20 is higher than a take-off point 52 thereof, as shown in FIG. 10A. In such a case, it is preferable that the line-of-sight direction 42 is held upward for as long a time as possible, so that the player can see up towards the landing point 50.

Figure 10B:
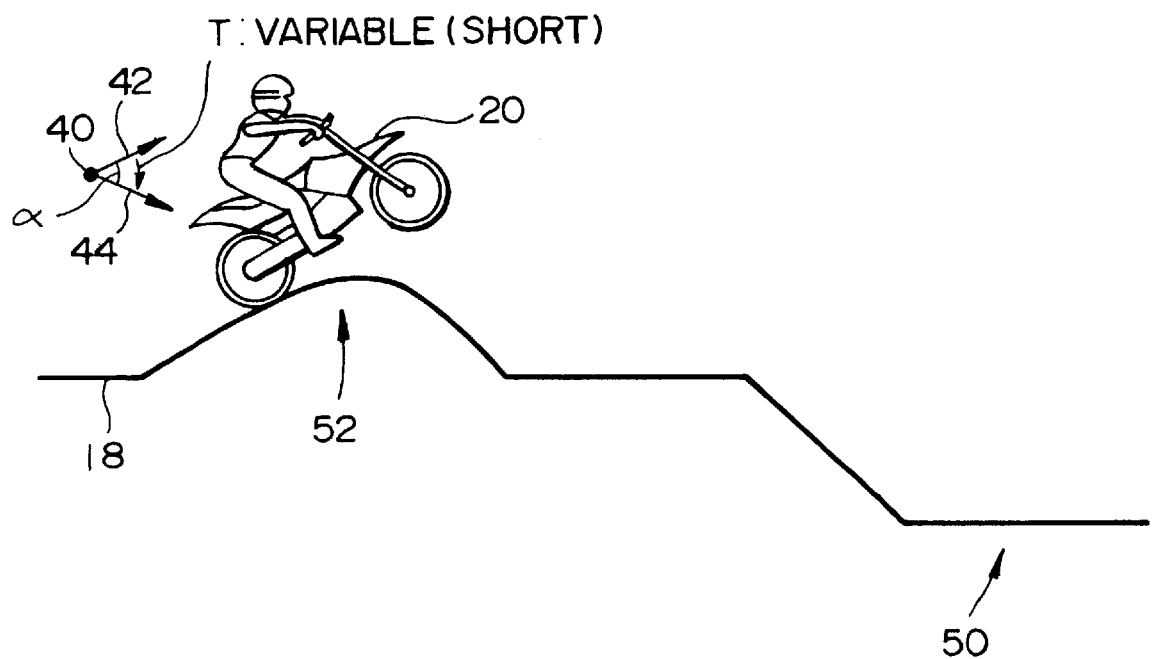

On the other hand, the state of the course 18 could be such that the landing point 50 is lower than the take-off point 52, as shown in FIG. 10B. In such a case, it is preferable that the line-of-sight direction 42 is changed downward as quickly as possible, so that the player can see down towards the landing point 50.

However, as previously described with reference to FIG. 6, when the bike does an ordinary jump in this embodiment (with an ordinary viewpoint control program), the line-of-sight direction 42 is controlled to change slowly to the target direction during the fixed time T. It is therefore impossible to keep the line-of-sight direction 42 upwards for a long time, as shown in FIG. 10A, or to quickly change the line-of-sight direction 42 downwards, as shown in FIG. 10B.

With this embodiment of the invention, this is handled by switching from the ordinary viewpoint control program to yet another viewpoint control program (hereinafter called a "second viewpoint control program") which enables variable control over the time during which the line-of-sight direction is changed to the target direction. In other words, the program selection data 30 of FIG. 2 is set to switch the viewpoint control program if the moving body 20 enters a jump area to a high landing point (FIG. 10A) or a jump area to a low landing point (FIG. 10B). If, for example, there is a jump area to a high landing point between the switchover points P3 and P4 and a jump area to a low landing point between the switchover points P5 and P6, by way of example, this second viewpoint control program is set for the viewpoint control program B of FIG. 2. This second viewpoint control program provides variable control over the time T during which the line-of-sight direction is changed to the target direction, as shown in FIGS. 10A and 10B.

The time T during which the line-of-sight direction is changed to the target direction is controlled by viewpoint control parameters. The viewpoint control parameter G1 for the area between switchover points P3 and P4 could be set to lengthen the time T, by way of example. Conversely, the viewpoint control parameter G2 for the area between switchover points P5 and P6 could be set to shorten the time T. This makes it possible to implement viewpoint control for impressive game images during a jump to a high landing point or a low landing point, with simple processing.

Figure 11:
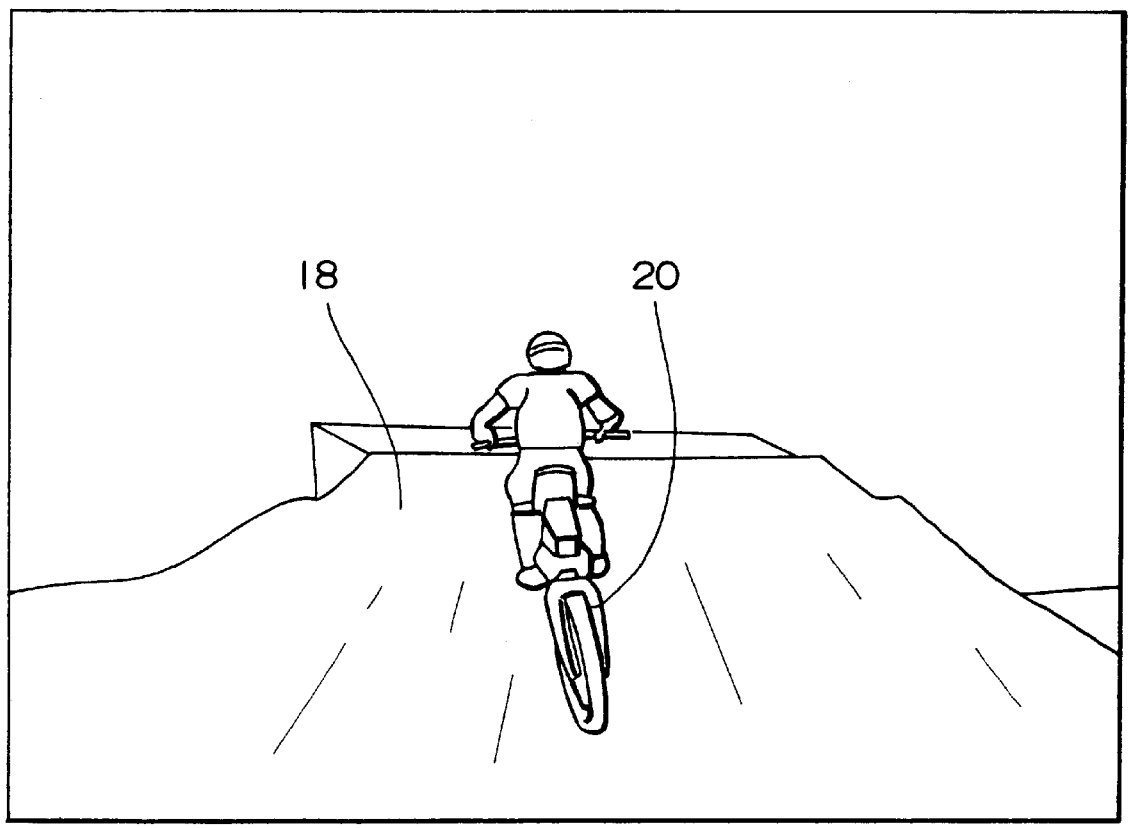
FIG. 11 shows an example of an image generated by this embodiment when the moving body is jumping to a high landing point.

Note that an example of the image shown on the display section 12 while the moving body 20 is jumping to a high landing point is shown in FIG. 11. This embodiment makes it possible to prevent problems such as the player losing sight of the landing point, because the line-of-sight direction of the player is directed upward for a long time even in such a case.

Figure 12:
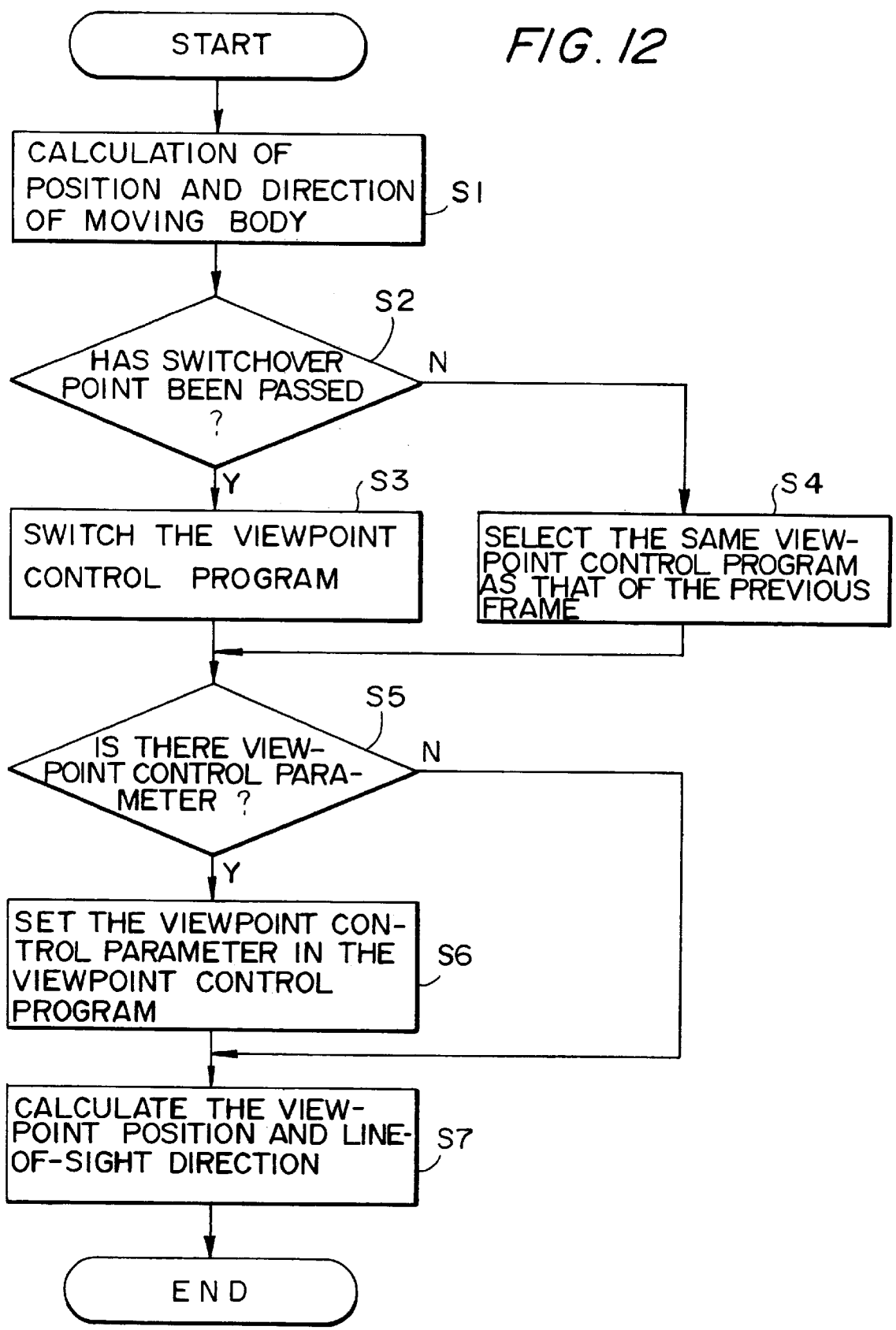
FIG. 12 is a flowchart illustrating a detailed example of the processing of this embodiment.

The description now turns to a detailed example of the processing of this embodiment, with reference to the flowchart of FIG. 12.

First of all, the moving body computation section 112 of FIG. 1 calculates the position and direction of the moving body (step S1). These calculations can be done once per frame, for example.

The system then determines whether or not the moving body has passed one of the switchover points of FIG. 2 (step S2). This calculation is based on the position data for the moving body, obtained by step S1.

If a switchover point has been passed, the viewpoint control program is switched, based on the program selection data 30 of FIG. 2 (step S3). If no switchover point has been passed, on the other hand, the viewpoint control program used for the previous frame is selected (step S4).

The system then determines whether or not there is a viewpoint control parameter (step S5). For example, it is determined that there is a viewpoint control parameter for each of the areas between the switchover points P3 and P4, P5 and P6, and P7 and P8 of FIG. 2, so that one of these viewpoint control parameters are set in the viewpoint control program selected in step S3 (step S6).

Finally, the viewpoint position and line-of-sight direction are calculated, based on the selected viewpoint control program (step S7).

Figure 13:
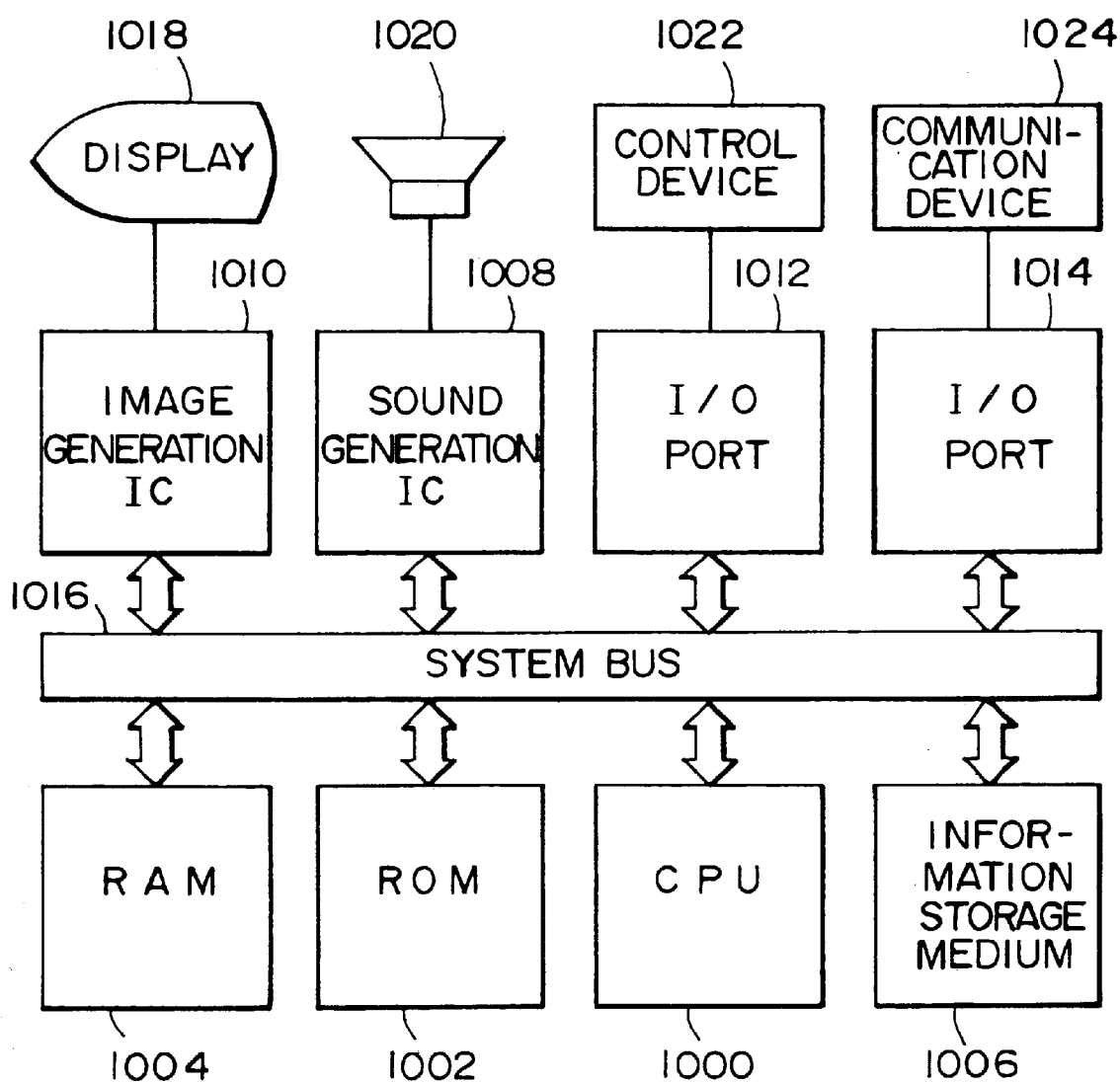
FIG. 13 shows an example of a hardware configuration capable of implementing this embodiment.

The description now turns to an example of hardware that can implement this embodiment, with reference to FIG. 13. In the apparatus shown in this figure, a CPU 1000, ROM 1002, RAM 1004, an information storage medium 1006, a sound generation IC 1008, an image generation IC 1010, and I/O ports 1012 and 1014 are connected together by a system bus 1016 so that data can be mutually transferred therebetween. A display 1018 is connected to the image generation IC 1010, a speaker 1020 is connected to the sound generation IC 1008, a control device 1022 is connected to the I/O port 1012, and a communications device 1024 is connected to the I/O port 1014.

Image data and sound data for representing display objects, and a program or the like are mainly stored in the information storage medium 1006. Means such as a CD-ROM, game cassette, or DVD could be used as an information storage medium for storing a game program for a domestic game machine, for example. Alternatively, memory such as ROM could be used for an arcade game machine, in which case the information storage medium 1006 is the ROM 1002.

The control device 1022 is equivalent to a game controller or operating panel and it is used as a device for inputting into the main unit of the device the results of decisions made by the player as the game progresses.

The CPU 1000 controls the entire device and processes data in accordance with a game program stored in the information storage medium 1006, a system program stored in the ROM 1002 (including initialization information for the entire device), and signals input through the control device 1022. The RAM 1004 is a storage means that is used as a work space for the CPU 1000, and specific details from the information storage medium 1006 or the ROM 1002, or the results of calculations by the CPU 1000, are stored therein. A data having the logical structure shown in FIG. 2 is built into this RAM or information storage medium.

The provision of the sound generation IC 1008 and the image generation IC 1010 in this type of device makes it possible to output game sounds and game images as required. The sound generation IC 1008 is an integrated circuit device that generates game sounds such as sound effects and background music, based on information stored in the information storage medium 1006 or the ROM 1002, and the thus generated game sounds are output by the speaker 1020. The image generation IC 1010 is an integrated circuit device that generates pixel information for output to the display 1018, based on image information that is sent from components such as the RAM 1004, the ROM 1002, and the information storage medium 1006. Note that a device called a head-mounted display (HMD) could be used as the display 1018.

The communications device 1024 transfers various types of information used within the game machine to and from external devices, and it is used to transfer given information in accordance with a game program when connected to another game machine, or transfer information such as a game program through a communications line.

The processing described with reference to FIGS. 1 to 11 is implemented by components such as the information storage medium 1006 that contains a game program for performing processing such as that shown in the flowchart of FIG. 12, the CPU 1000 that operates in accordance with that program, and the image generation IC 1010 and sound generation IC 1008. Note that the processing performed by the image generation IC 1010 and the sound generation IC 1008 could be performed in a software manner by means such as the CPU 1000 or an ordinary DSP.

An example of this embodiment applied to an arcade game machine is shown in FIG. 14. The player operates an accelerator 1102 and brakes 1104 and rolls (banks) a vehicle 1105, while viewing a game image shown on a display 1100, to manipulate a moving body 1103 on the screen and thus enjoy the game. Components such as a CPU, an image generation IC, and a sound generation IC are mounted on a system board 1106 built into the device, as shown in FIG. 14. Information is stored in a memory 1108, which is the information storage medium on the system board 1106. This information comprises information for performing calculations for causing a moving body to move over a course within the object space; information for selecting one viewpoint control program from a plurality of viewpoint control programs, based on program selection data that is set for the course, and controlling a viewpoint to follow the movement of the moving body, based on the thus selected viewpoint control program; information for generating an image as seen from this viewpoint within the object space; and information for controlling the viewpoint, based on the selected viewpoint control program and a viewpoint control parameter that is set for the course, linking the program selection data. This information is hereinafter called stored information. This stored information comprises at least one type of information, such as program coding for performing the above described processing, image information, sound information, shape information for display objects, table data, list data, or player information.

Figure 15A:
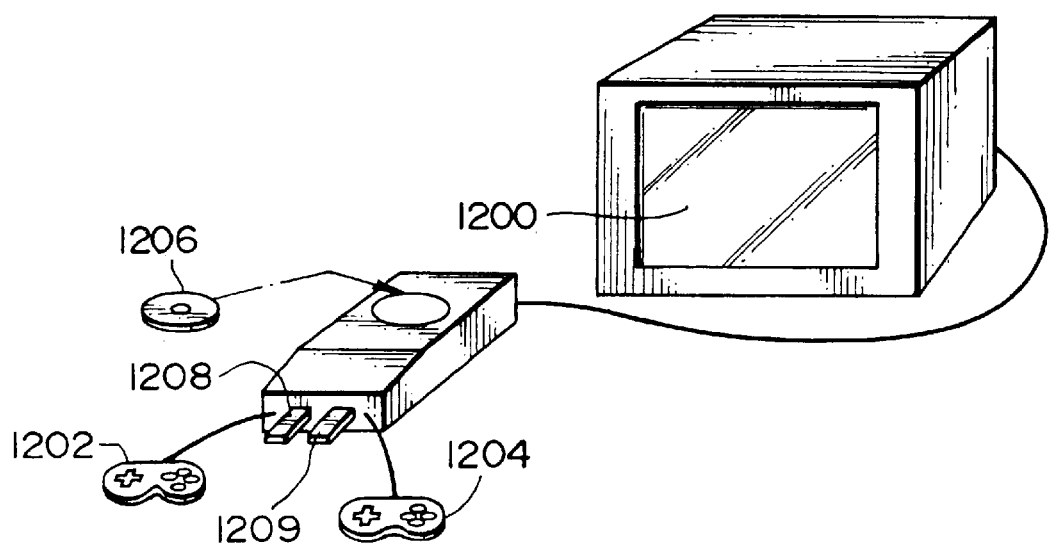
FIGS. 15A and 15B show examples of different types of apparatus to which this embodiment is applied.

An example of this embodiment applied to a domestic game machine is shown in FIG. 15A. Players enjoy the game by manipulating game controllers 1202 and 1204 while viewing a game image shown on a display 1200. In this case, the above described stored information is stored in a CD-ROM 1206 or IC cards 1208 and 1209 that are information storage media that can be freely inserted into and removed from the main unit.

Figure 15B:
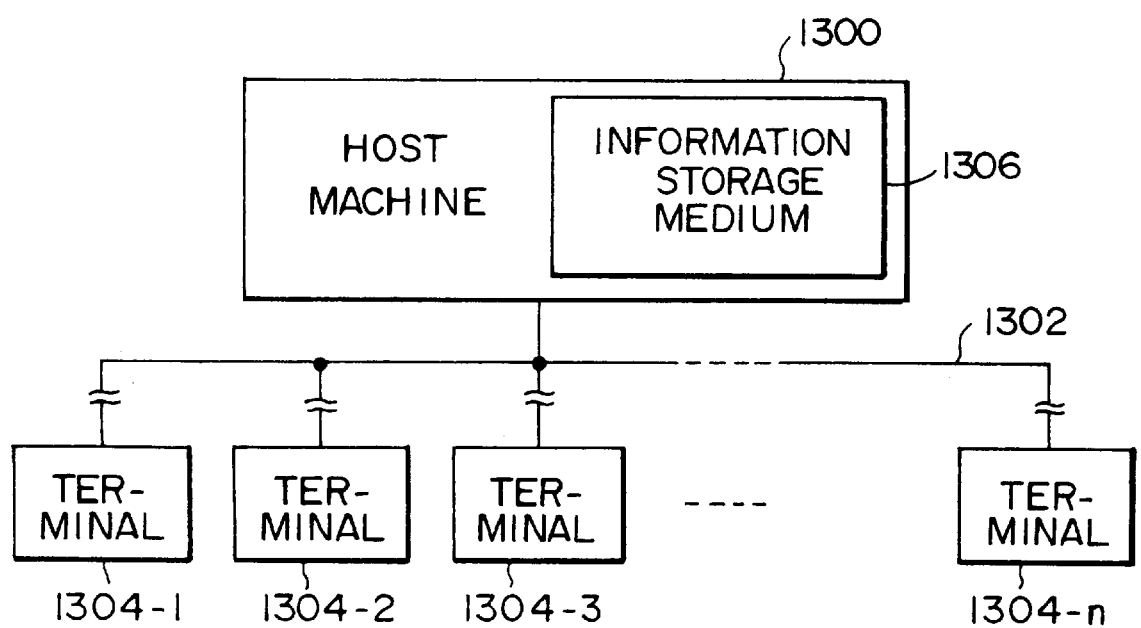

An example of this embodiment applied to a game machine is shown in FIG. 15B, where the game machine comprises a host machine 1300 and terminals 1304-1 to 1304-n connected to the host machine 1300 by communications lines 1302. In this case, the above described stored information is stored in an information storage medium 1306 such as a magnetic disk, magnetic tape, or memory that can be controlled by the host machine 1300. If each of the terminals 1304-1 to 1304-n has a CPU, an image generation IC, and a sound generation IC to generate game images and sounds in a stand-alone manner , means such as a game program for generating game images and sounds is transferred to the terminals 1304-1 to 1304-n from the host machine 1300. On the other hand, if they cannot be generated in a stand-alone manner, the host machine 1300 generates the game images and sounds then transfers them to the terminals 1304-1 to 1304-n for output by those terminals.

Note that this invention is not limited to the above described embodiments and it can be implemented in various other ways.

For example, the method used for selecting one viewpoint control program from a plurality of viewpoint control programs is preferably the method described with reference to FIG. 2, from the viewpoints of simpler processing and reduced processing load, but it is not limited thereto.

Similarly, the viewpoint control provided by viewpoint control programs is preferably that described with reference to this embodiment of the invention, but it is not limited thereto.

This invention is also not limited to a bike-riding game; it can also be applied to various other games, and also to training simulators.

This invention is also not limited to domestic and arcade game machines; it can also be applied to various other image generation devices such as simulators, large-scale attractions in which many players can participate, personal computers, multimedia terminals, and system boards that generate game images.

What is claimed is:

1. An image generation device for generating an image as seen from a given viewpoint within an object space, comprising:

means for performing calculations for causing a moving body to move on a course within said object space;

means for selecting one viewpoint control program from a plurality of viewpoint control programs, based on program selection data set for said course, and controlling a viewpoint that follows the movement of said moving body, based on the selected viewpoint control program;

means for generating an image as seen from said viewpoint within said object wherein switchover points are set on the course, and whether or not said moving body has passed each switchover point is determined by comparing a distance between said moving body and a start point and a distance between each switchover point and the start point;

wherein when said moving body passes each switchover point, a viewpoint control program which is set to the passed switchover point is selected, and the viewpoint that follows the movement of said moving body is controlled based on the selected viewpoint control program;

wherein said viewpoint control means selects based on said program selection data, a viewpoint control program that causes a line-of-sight direction to vary in accordance with changes in the inclination of said course, when said moving body is moving through an ordinary area of said course; and wherein said viewpoint control means selects based on said program selection data, a viewpoint control program that holds said line-of-sight direction in a fixed direction irrespective of changes in the inclination of said course when said moving body is moving in a first area that differs from said ordinary area.

2. An image generation device for generating an image as seen from a given viewpoint within an object space, comprising:

means for performing calculations for causing a moving body to move on a course within said object space;

means for selecting one viewpoint control program from a plurality of viewpoint control programs, based on program selection data set for said course, and controlling a viewpoint that follows the movement of said moving body, based on the selected viewpoint control program; and means for generating an image as seen from said viewpoint within said object space;

wherein switchover points are set on the course, and said program selection data has a data structure in which each viewpoint control program to be selected when said moving body passes each switchover point is set to each switchover point;

wherein a viewpoint control program that causes a line-of-sight direction to vary in accordance with changes in the inclination of said course is selected based on said program selection data, when said moving body is moving through an ordinary area of said course; and wherein a viewpoint control program that holds said line-of-sight direction in a fixed direction irrespective of changes in the inclination of said course is selected based on said program selection data, when said moving body is moving in a first area that differs from said ordinary area.

3. An image generation device for generating an image as seen from a given viewpoint within an object space, comprising:

means for performing calculations for causing a moving body to move on a course within said object space;

means for selecting one viewpoint control program from a plurality of viewpoint control programs, based on program selection data set for said course, and controlling a viewpoint that follows the movement of said moving body, based on the selected viewpoint control program; and means for generating an image as seen from said viewpoint within said object space;

wherein switchover points are set on the course and an identical viewpoint control program is set in one area between one pair of switchover points and in another area between another pair of switchover points while a different viewpoint control parameter is et in said one area and in said another area;

wherein a viewpoint control program that causes a line-of-sight direction to vary in accordance with changes in the inclination of said course is selected based on said program selection data, when said moving body is moving through an ordinary area of said course; and wherein a viewpoint control program that holds said line-of-sight direction in a fixed direction irrespective of changes in the inclination of said course is selected based on said program selection data, when said moving body is moving in a first area that differs from said ordinary area.

4. An image generation device for generating an image as seen from a given viewpoint within an object space, comprising:

means for performing calculations for causing a moving body to move on a course within said object space;

means for selecting one viewpoint control program from a plurality of viewpoint control programs, based on program selection data set for said course, and controlling a viewpoint that follows the movement of said moving body, based on the selected viewpoint control program; and means for generating an image as seen from said viewpoint within said object space;

wherein switchover points are set on the course, and said program selection data has a data structure in which each viewpoint control parameter to be read when said moving body passes each switchover point is set to each switchover point;

wherein a viewpoint control program that causes a line-of-sight direction to vary in accordance with changes in the inclination of said course is selected based on said program selection data, when said moving body is moving through an ordinary area of said course; and wherein a viewpoint control program that holds said line-of-sight direction in a fixed direction irrespective of changes in the inclination of said course is selected based on said program selection data, when said moving body is moving in a first area that differs from said ordinary area.

5. An image generation device for generating an image as seen from a given viewpoint within an object space, comprising:

means for performing calculations for causing a moving body to move on a course within said object space;

means for selecting one viewpoint control program from a plurality of viewpoint control programs, based on program selection data set for said course, and controlling a viewpoint that follows the movement of said moving body, based on the selected viewpoint control program; and means for generating an image as seen from said viewpoint within said object space;

wherein said viewpoint control means selects based on said program selection data, a viewpoint control program that causes a line-of-sight direction to change to a target direction during a fixed time after said moving body has jumped in an ordinary area of said course; and wherein said viewpoint control means selects based on said program selection data, a viewpoint control program that causes said line-of-sight direction to change to a target direction after said moving body has jumped in a second area different from said ordinary area, and also provides variable control over the time during which said line-of-sight direction is changed to said target direction.

6. The image generation device as defined in claim 5, wherein said viewpoint control means provides variable control over the time during which said line-of-sight direction is changed to said target direction, based on a viewpoint control parameter that is set for said course and linked to said program selection data.

7. An information storage medium used in an image generation device for generating an image as seen from a given viewpoint within an object space, comprising:

information for performing calculations for causing a moving body to move on a course within said object pace;

information for selecting one viewpoint control program from a plurality of viewpoint control programs, based on program selection data that is set for said course, and controlling a viewpoint that follows the movement of said moving body, based on the selected viewpoint control program; and information for generating an image as seen from said viewpoint within said object space;

wherein switchover points are set on the course, and whether or not said moving body has passed each switchover point is determined by comparing a distance between said moving body and a start point and a distance between each switchover point and the start point;

wherein when said moving body passes each switchover point, a viewpoint control program which is set to the passed switchover point is selected, and the viewpoint that follows the movement of said moving body is controlled based on the selected viewpoint control program;

wherein when said moving body is moving through an ordinary area of said course, a viewpoint control program that causes a line-of-sight direction to vary in accordance with changes in the inclination of said course is selected based on said program selection data; and wherein when said moving body is moving in a first area that differs from said ordinary area, a viewpoint control program that holds said line-of-sight direction in a fixed direction irrespective of chances in the inclination of said course is selected based on said program selection data.

8. An information storage medium used in an image generation device for generating an image as seen from a given viewpoint within an object space, comprising:

information for performing calculations for causing a moving body to move on a course within said object space;

information for selecting one viewpoint control program from a plurality of viewpoint control programs, based on program selection data that is set for said course, and controlling a viewpoint that follows the movement of said moving body, based on the selected viewpoint control program; and information for generating an image as seen from said viewpoint within said object space;

wherein switchover points are set on the course, and said program selection data has a data structure in which each viewpoint control program to be selected when said moving body passes each switchover point is set to each switchover point;

wherein when said moving body is moving through an ordinary area of said course, a viewpoint control program that causes a line-of-sight direction to vary in accordance with changes in the inclination of said course is selected based on said program selection data; and wherein when said moving body is moving in a first area that differs from said ordinary area, a viewpoint control program that holds said line-of-sight direction in a fixed direction irrespective of changes in the inclination of said course is selected based on said program selection data.

9. An information storage medium used in an image generation device for generating an image as seen from a given viewpoint within an object space, comprising:

information for performing calculations for causing a moving body to move on a course within said object space;

information for selecting one viewpoint control program from a plurality of viewpoint control programs, based on program selection data that is set for said course, and controlling a viewpoint that follows the movement of said moving body, based on the selected viewpoint control program; and information for generating an image as seen from said viewpoint within said object space;

wherein switchover points are set on the course, and an identical viewpoint control program is set in one area between one pair of switchover points and in another area between another pair of switchover points while a different viewpoint control parameter is set in said one area and in said another area;

wherein when said moving body is moving through an ordinary area of said course, a viewpoint control program that causes a line-of-sight direction to vary in accordance with changes in the inclination of said course is selected based on said program selection data; and wherein when said moving body is moving in a first area that differs from said ordinary area, a viewpoint control program that holds said line-of-sight direction in a fixed direction irrespective of changes in the inclination of said course is selected based on said program selection data.

10. An information storage medium used in an image generation device for generating an image as seen from a given viewpoint within an object space, comprising:

information for performing calculations for causing a moving body to move on a course within said object space;

information for selecting one viewpoint control program from a plurality of viewpoint control programs, based on program selection data that is set for said course, and controlling a viewpoint that follows the movement of said moving body, based on the selected viewpoint control program; and information for venerating an image as seen from said viewpoint within said object space;

wherein switchover points are set on the course, and said program selection data has a data structure in which each viewpoint control parameter to be read when said moving body passes each switchover point is set to each switchover point;

wherein when said moving body is moving through an ordinary area of said course, a viewpoint control program that causes a line-of-sight direction to vary in accordance with changes in the inclination of said course is selected based on said program selection data; and wherein when said moving body is moving in a first area that differs from said ordinary area, a viewpoint control program that holds said line-of-sight direction in a fixed direction irrespective of changes in the inclination of said course is selected based on said program selection data.

11. An information storage medium used in an image generation device for generating an image as seen from a given viewpoint within an object space, comprising:

information for performing calculations for causing a moving body to move on a course within said object space;

information for selecting one viewpoint control program from a plurality of viewpoint control programs, based on program selection data that is set for said course, and controlling a viewpoint that follows the movement of said moving body, based on the selected viewpoint control program; and information for generating an image as seen from said viewpoint within said object space;

wherein a viewpoint control program that causes a line-of-sight direction to change to a target direction during a fixed time after said moving body has jumped in an ordinary area of said course, is selected based on said program selection data; and wherein a viewpoint control program that causes a line-of-sight direction to change to a target direction during a fixed time after said moving body has jumped in an ordinary area of said course, is selected based on said program selection data; and wherein a viewpoint control program that causes said line-of-sight direction to change to said target direction after said moving body has jumped in a second area different from said ordinary area, and also provides variable control over the time during which said line-of-sight direction is changed to said target direction, is selected based on said program selection data.

12. The information storage medium as defined in claim 11, wherein the time during which said line-of-sight direction is changed to said target direction is subjected to variable control, based on a viewpoint control parameter that is set for said course and linked to said program selection data.

\* \* \* \* \*